United States Patent
Jiang et al.

(10) Patent No.: US 10,255,129 B2
(45) Date of Patent: Apr. 9, 2019

(54) FAULT DIAGNOSIS METHOD AND APPARATUS FOR BIG-DATA NETWORK SYSTEM

(71) Applicant: Huawei Technologies Co., Ltd., Shenzhen (CN)

(72) Inventors: Xin Jiang, Hong Kong (HK); Hang Li, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 94 days.

(21) Appl. No.: 15/292,561

(22) Filed: Oct. 13, 2016

(65) Prior Publication Data

US 2017/0102984 A1  Apr. 13, 2017

(30) Foreign Application Priority Data

Oct. 13, 2015  (CN) .......................... 2015 1 0669888

(51) Int. Cl.
  *G06F 11/00* (2006.01)
  *G06F 11/07* (2006.01)
  *G05B 23/02* (2006.01)
  *H04L 12/24* (2006.01)

(52) U.S. Cl.
  CPC ............ *G06F 11/079* (2013.01); *G05B 23/02* (2013.01); *G06F 11/0709* (2013.01); *G06F 11/0751* (2013.01); *G06F 11/0787* (2013.01); *H04L 41/00* (2013.01)

(58) Field of Classification Search
  USPC ......................................................... 714/37
  See application file for complete search history.

(56) References Cited

U.S. PATENT DOCUMENTS

| | | | | |
|---|---|---|---|---|
| 6,012,152 | A * | 1/2000 | Douik ................. | G06F 11/0709 714/26 |
| 8,484,592 | B1 * | 7/2013 | Kocan ................. | G06F 17/5031 716/108 |
| 9,858,529 | B2 * | 1/2018 | Adams .................... | G06N 7/005 |
| 2009/0006476 | A1 * | 1/2009 | Andreasen ............. | G06Q 50/30 |
| 2016/0169202 | A1 * | 6/2016 | Wang ...................... | H02J 3/386 290/44 |
| 2018/0082172 | A1 * | 3/2018 | Patel .................... | G06N 3/0472 |

FOREIGN PATENT DOCUMENTS

CN  204089885 U  1/2015

OTHER PUBLICATIONS

Gens, R., et al., "Discriminative Learning of Sum-Product Networks," Department of Computer Science and Engineering, Jan. 16, 2013, 9 pages.

(Continued)

*Primary Examiner* — Yair Leibovich
(74) *Attorney, Agent, or Firm* — Conley Rose, P.C.

(57) ABSTRACT

A fault diagnosis method for a big-data network system includes extracting fault information from historical data in the network system, to form training sample data, which is trained to obtain a deep sum product network model that can be used to perform fault diagnosis; and diagnosing a fault of the network system based on the deep sum product network model. The embodiments of the present application resolve a problem that it is difficult to diagnose a fault of a big-data network system.

16 Claims, 7 Drawing Sheets

(56) References Cited

OTHER PUBLICATIONS

Gens, R., et al., "Learning to Structure of Sum-Product Networks," Proceedings of the 30th International Conference on Machine Learning, 2013, 8 pages.

Poon, H., et al., "Sum-Product Networks: A New Deep Architecture," Feb. 14, 2012, 10 pages.

Machine Translation and Abstract of Chinese Publication No. CN204089885, Jan. 7, 2015, 7 pages.

Jun, S., et al, "Research on Fault Diagnosis Method of Neural Network," Computing Technology and Automation, vol. 17, No. 1, Mar. 1998, 5 pages.

Abstract of Jun, S., et al, "Research on Fault Diagnosis Method of Neural Network," Computing Technology and Automation, vol. 17, No. 1, Mar. 1998, 1 page.

Foreign Communication From a Counterpart Application, Chinese Application No. 201510669888.2, Chinese Office Action dated Dec. 19, 2018, 4 pages.

Foreign Communication From a Counterpart Application, Chinese Application No. 201510669888.2, Chinese Search Report dated Nov. 29, 2018, 2 pages.

\* cited by examiner

FAULT DIAGNOSIS METHOD AND APPARATUS FOR BIG-DATA NETWORK SYSTEM

CROSS-REFERENCE TO RELATED APPLICATION

This application claims priority to Chinese Patent Application No. 201510669888.2, filed on Oct. 13, 2015, which is hereby incorporated by reference in its entirety.

TECHNICAL FIELD

Embodiments of the present application relate to the big data processing field, and more specifically, to a fault diagnosis method and apparatus for a big-data network system.

BACKGROUND

Fault diagnosis is a process in which various checking and testing methods are used to determine a status and an abnormal situation of a system and locate a type of a fault or a cause why a fault is generated, and finally, a solution is provided to perform fault recovery.

Fault diagnosis is an important process in many industrial systems. In recent years, as the modern industry demonstrates a trend of becoming larger and more complex, fault diagnosis becomes more important, and a greater challenge is imposed on a fault diagnosis technology.

Conventional fault diagnosis manners mainly include two types: one type is to establish an accurate fault diagnosis model, and the other type is to perform diagnosis based on experience of experts. The foregoing two fault diagnosis modes are mainly applicable to fault diagnosis of a simple system. However, data of a big-data network system (such as a network of a telecommunications operator or a large data center network) is of various types, and includes structured data, such as data in a database, and also includes non-structured data, such as a graph or text. In addition, the big-data network system generates massive data each day, and network system fault symptoms and causes are also diversified. Therefore, it is very difficult to perform diagnosis by relying on a conventional fault diagnosis method.

SUMMARY

Embodiments of the present application provide a fault diagnosis method and apparatus for a big-data network system, to resolve a problem that it is difficult to perform diagnosis on the big-data network system.

According to a first aspect, a fault diagnosis method for a big-data network system is provided, including obtaining historical data of the network system, where the historical data is heterogeneous data, the heterogeneous data includes structured data and non-structured data, and the historical data includes fault information, which is used to describe a cause and a symptom of multiple faults of the network system; obtaining the fault information from a structured field of the structured data and data content of the non-structured data, to determine multiple groups of values of fault-related random variables, where one group of values of the fault-related random variables is used to indicate an association relationship between a symptom and a cause of one fault of the network system, and the fault-related random variables include a random variable of a first category and a random variable of a second category, where the random variable of the first category is used to represent a symptom of a fault of the network system, and the random variable of the second category is used to represent a cause of the fault of the network system; using the multiple groups of values of the fault-related random variables as training sample data, to train a deep sum product network model; assigning a value to the random variable of the first category according to a symptom of a current fault of the network system; determining a marginal probability or a conditional probability of the random variable of the second category by using the deep sum product network model and according to the assigned value of the random variable of the first category; and deducing a cause of the current fault according to the marginal probability or the conditional probability of the random variable of the second category.

With reference to the first aspect, in an implementation manner of the first aspect, the using the multiple groups of values of the fault-related random variables as training sample data, to train a deep sum product network model includes generating a numerical matrix according to the multiple groups of values, where each row of the numerical matrix is corresponding to one fault of the multiple faults of the network system, and each column of the numerical matrix is corresponding to one variable of the fault-related random variables; dividing the numerical matrix into m×n first submatrices of an equal size, where both m and n are positive integers, and a sum of m and n is greater than or equal to 2; obtaining m×n sum product network models in a distributed training manner and according to the m×n first submatrices; and determining the deep sum product network model according to the m×n sum product network models.

With reference to the first aspect or any one of the foregoing implementation manner of the first aspect, in another implementation manner of the first aspect, the determining the deep sum product network model according to the m×n sum product network models includes calculating a product of sum product network models obtained by training first submatrices that are located in a same row in the m×n first submatrices, to obtain m intermediate sum product network models; and calculating a sum of the m intermediate sum product network models, to obtain the deep sum product network model.

With reference to the first aspect or any one of the foregoing implementation manners of the first aspect, in another implementation manner of the first aspect, the determining the deep sum product network model according to the m×n sum product network models includes calculating a sum of sum product network models obtained by training first submatrices that are located in a same column in the m×n first submatrices, to obtain n intermediate sum product network models; and calculating a product of the n intermediate sum product network models, to obtain the deep sum product network model.

With reference to the first aspect or any one of the foregoing implementation manners of the first aspect, in another implementation manner of the first aspect, the determining the deep sum product network model according to the m×n sum product network models includes generating a target matrix that uses the m×n sum product network models as elements; and recursively splitting the target matrix based on an independence test of a random variable and mixture probabilistic model estimation, to obtain the deep sum product network model, where the deep sum product network uses the m×n sum product network models as leaf nodes.

With reference to the first aspect or any one of the foregoing implementation manners of the first aspect, in another implementation manner of the first aspect, the obtaining the fault information from a structured field of the structured data and data content of the non-structured data, to determine multiple groups of values of fault-related random variables includes discretizing information in the structured field according to a value range of the structured field in the structured data, to determine the values of the fault-related random variables; and/or extracting information from the data content of the non-structured data by using at least one of a named-entity recognition algorithm, a keyword extraction algorithm, a relationship extraction algorithm, or a text categorization algorithm, to determine the values of the fault-related random variables.

With reference to the first aspect or any one of the foregoing implementation manners of the first aspect, in another implementation manner of the first aspect, the structured data is data in a database, and the discretizing information in the structured field according to a value range of the structured field in the structured data, to determine the values of the fault-related random variables includes performing discretization column by column in the database according to a value range of a field corresponding to each column in the database, to obtain the values of the fault-related random variables.

According to a second aspect, a fault diagnosis apparatus for a big-data network system is provided, including an obtaining module configured to obtain historical data of the network system, where the historical data is heterogeneous data, the heterogeneous data includes structured data and non-structured data, and the historical data includes fault information, which is used to describe a cause and a symptom of multiple faults of the network system; an extraction module configured to obtain the fault information from a structured field of the structured data and data content of the non-structured data, to determine multiple groups of values of fault-related random variables, where one group of values of the fault-related random variables is used to indicate an association relationship between a symptom and a cause of one fault of the network system, and the fault-related random variables include a random variable of a first category and a random variable of a second category, where the random variable of the first category is used to represent a symptom of a fault of the network system, and the random variable of the second category is used to represent a cause of the fault of the network system; a training module configured to use the multiple groups of values of the fault-related random variables as training sample data, to train a deep sum product network model; a value assignment module configured to assign a value to the random variable of the first category according to a symptom of a current fault of the network system; a determining module configured to determine a marginal probability or a conditional probability of the random variable of the second category by using the deep sum product network model and according to the assigned value of the random variable of the first category; and a deduction module configured to deduce a cause of the current fault according to the marginal probability or the conditional probability of the random variable of the second category.

With reference to the second aspect, in an implementation manner of the second aspect, the training module is configured to generate a numerical matrix according to the multiple groups of values, where each row of the numerical matrix is corresponding to one fault of the multiple faults of the network system, and each column of the numerical matrix is corresponding to one variable of the fault-related random variables; divide the numerical matrix into m×n first submatrices of an equal size, where both m and n are positive integers, and a sum of m and n is greater than or equal to 2; obtain m×n sum product network models in a distributed training manner and according to the m×n first submatrices; and determine the deep sum product network model according to the m×n sum product network models.

With reference to the second aspect or any one of the foregoing implementation manner of the second aspect, in another implementation manner of the second aspect, the training module is configured to calculate a product of sum product network models obtained by training first submatrices that are located in a same row in the m×n first submatrices, to obtain m intermediate sum product network models; and calculate a sum of the m intermediate sum product network models, to obtain the deep sum product network model.

With reference to the second aspect or any one of the foregoing implementation manners of the second aspect, in another implementation manner of the second aspect, the training module is configured to calculate a sum of sum product network models obtained by training first submatrices that are located in a same column in the m×n first submatrices, to obtain n intermediate sum product network models; and calculate a product of the n intermediate sum product network models, to obtain the deep sum product network model.

With reference to the second aspect or any one of the foregoing implementation manners of the second aspect, in another implementation manner of the second aspect, the training module is configured to generate a target matrix that uses the m×n sum product network models as elements; and recursively split the target matrix based on an independence test of a random variable and mixture probabilistic model estimation, to obtain the deep sum product network model, where the deep sum product network uses the m×n sum product network models as leaf nodes.

With reference to the second aspect or any one of the foregoing implementation manners of the second aspect, in another implementation manner of the second aspect, the extraction module is configured to discretize information in the structured field according to a value range of the structured field in the structured data, to determine the values of the fault-related random variables; and/or extract information from the data content of the non-structured data by using at least one of a named-entity recognition algorithm, a keyword extraction algorithm, a relationship extraction algorithm, or a text categorization algorithm, to determine the values of the fault-related random variables.

With reference to the second aspect or any one of the foregoing implementation manners of the second aspect, in another implementation manner of the second aspect, the structured data is data in a database, and the extraction module is configured to perform discretization column by column in the database according to a value range of a field corresponding to each column in the database, to obtain the values of the fault-related random variables.

A deep sum product network model is a multi-layer non-linear probability model. This type of probability model features large scale, strong expressiveness, high efficiency in accurate deduction, and the like, and is mostly applied in an image processing field. In order to apply the deep sum product network model to fault diagnosis in a big-data network system, in the embodiments of the present application, random variables are first divided into a random variable of a first category and a random variable of a second category, and then fault information is extracted from various types of heterogeneous data, so as to assign a value to a random variable, thereby obtaining training sample data that meets a training requirement of the deep sum product network model. After the deep sum product network model is trained, a value is assigned to the random variable of the first category according to a symptom of a current fault of the network system, and then a marginal probability or a conditional probability of the random variable of the second category is deduced, thereby deducing a cause of the current fault of the network system. By using the foregoing manner, in the embodiments of the present application, the deep sum product network model is applied to a fault diagnosis process in the big-data network system, so as to resolve a problem that it is difficult to diagnose a fault of the big-data network system.

BRIEF DESCRIPTION OF THE DRAWINGS

To describe the technical solutions in the embodiments of the present application more clearly, the following briefly describes the accompanying drawings required for describing the embodiments of the present application. The accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. The described embodiments are a part rather than all of the embodiments of the present application. All other embodiments obtained by a person of ordinary skill in the art based on the embodiments of the present application without creative efforts shall fall within the protection scope of the present application.

For ease of understanding, first, a definition of a deep sum product network model and a probability deduction manner are briefly described.

A problem addressed by the deep sum product network model is as follows: for a group of random variables $\{X_1, X_2, \ldots, X_p\}$, several observation samples are given, and a multi-variate probabilistic model of the observation samples is established, thereby deducing a marginal probability $P(X_A)$ or a conditional probability $P(X_A|X_B)$, where both A and B are subsets of $\{1, \ldots, p\}$.

The following briefly describes the deep sum product network model with reference to FIGS. 1A, 1B, 1C, and 1D.

FIG. 1A shows a uni-variate probability distributed sum product network.

FIG. 1B shows a product-type sum product network including two sum product networks whose variable sets do not intersect.

FIG. 1C shows a weighted sum-type sum product network including two sum product networks whose variable sets are consistent.

FIG. 1D shows a deep sum product network obtained by stacking the foregoing simple-type sum product networks.

A manner of deducing a deep sum product network is as follows.

Values are assigned to leaf nodes and are calculated from bottom to top, and a final probability value can be obtained when a value of a root node is calculated.

A marginal probability is calculated by setting a marginalized variable probability to 1.

A conditional probability is calculated by using a Bayes formula $P(X_A|X_B)=P(X_A, X_B)/P(X_B)$.

The following briefly describes a process of training a deep sum product network model.

First, training sample data of a deep sum product network may be considered as a $|T|\times|V|$ matrix M, where T represents a sample set (where $|T|$ represents a quantity of samples), and V represents a random variable set (where $|V|$ represents a quantity of random variable).

Figure 1:
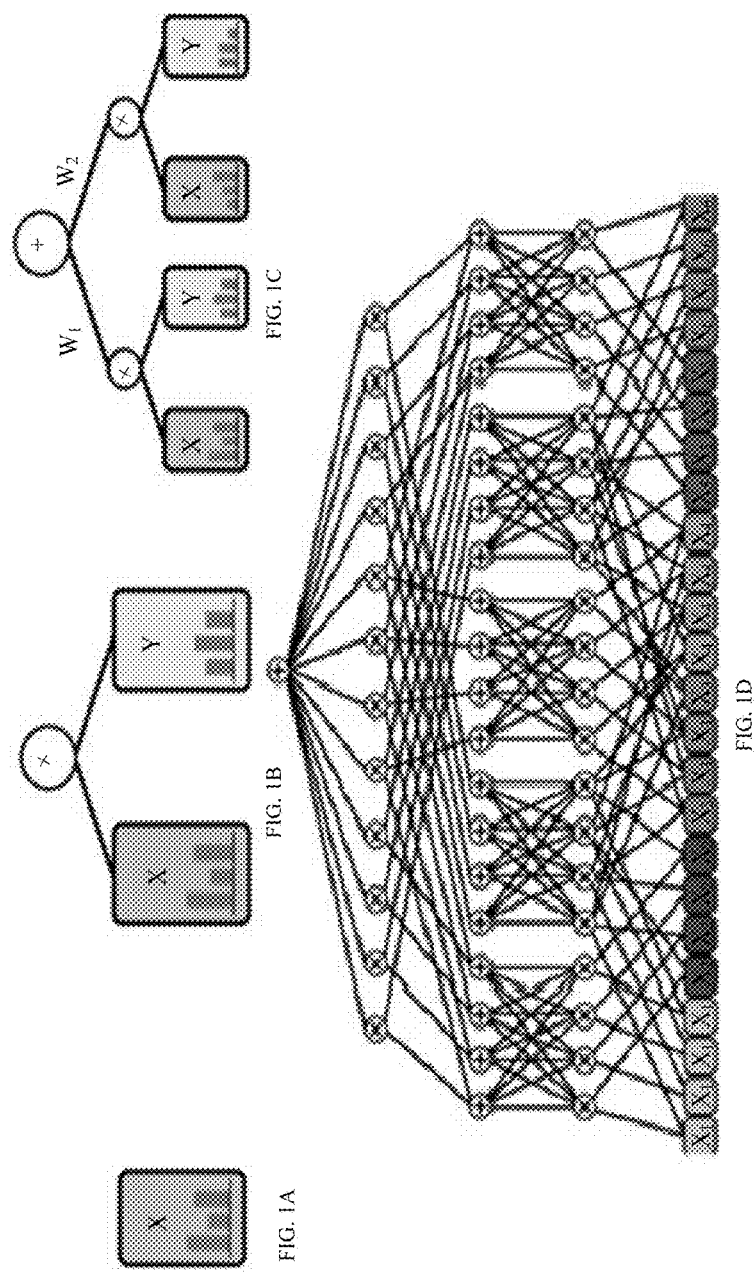
FIGS. 1A, 1B, 1C, and 1D are schematic structural diagrams of a deep sum product network.
Figure 2:
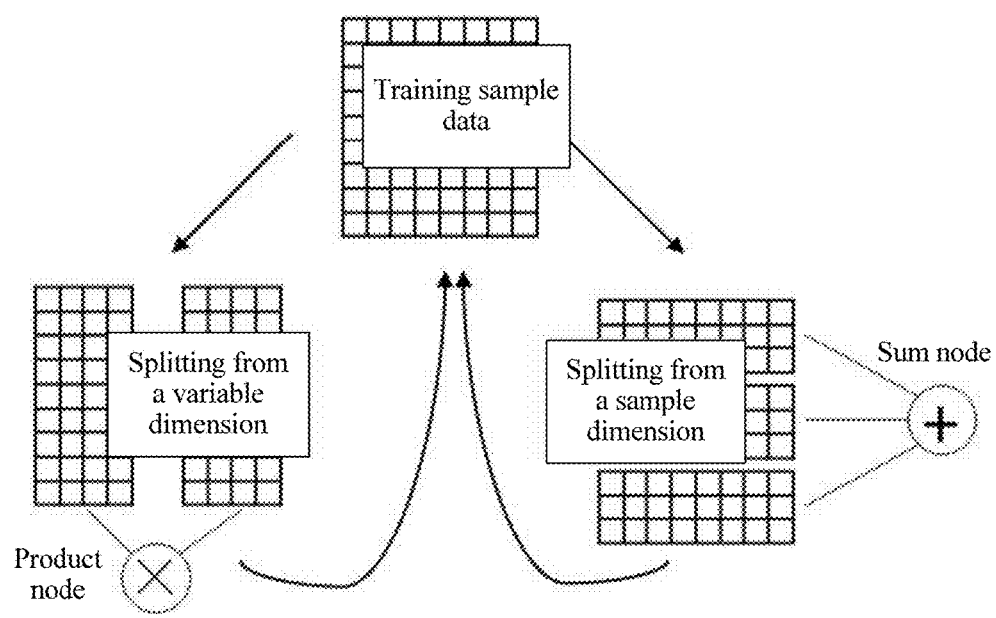
FIG. 2 is a schematic diagram of a training process of a deep sum product network.

A process of training a structure of the deep sum product network is shown in FIG. 2, and a step is as follows: recursively performing variable-dimension splitting (which is column splitting of the matrix M) and sample-dimension splitting (which is row splitting of the matrix M) on the training sample data, where in each iteration, whether the data is split in a variable dimension or a sample dimension is first selected.

In splitting in the variable dimension (that is, column splitting of the matrix M), an independence test (Independency test), or referred to as an independence hypothesis test, is performed on the random variable set, to split variables into independent sets, where each variable splitting is corresponding to one "product" node in the deep sum product network.

In splitting in the sample dimension (that is, row splitting of the matrix M), a mixture probabilistic model is trained, to divide a sample into different components, where each sample splitting is corresponding to one "sum" node in the deep sum product network.

Figure 3:
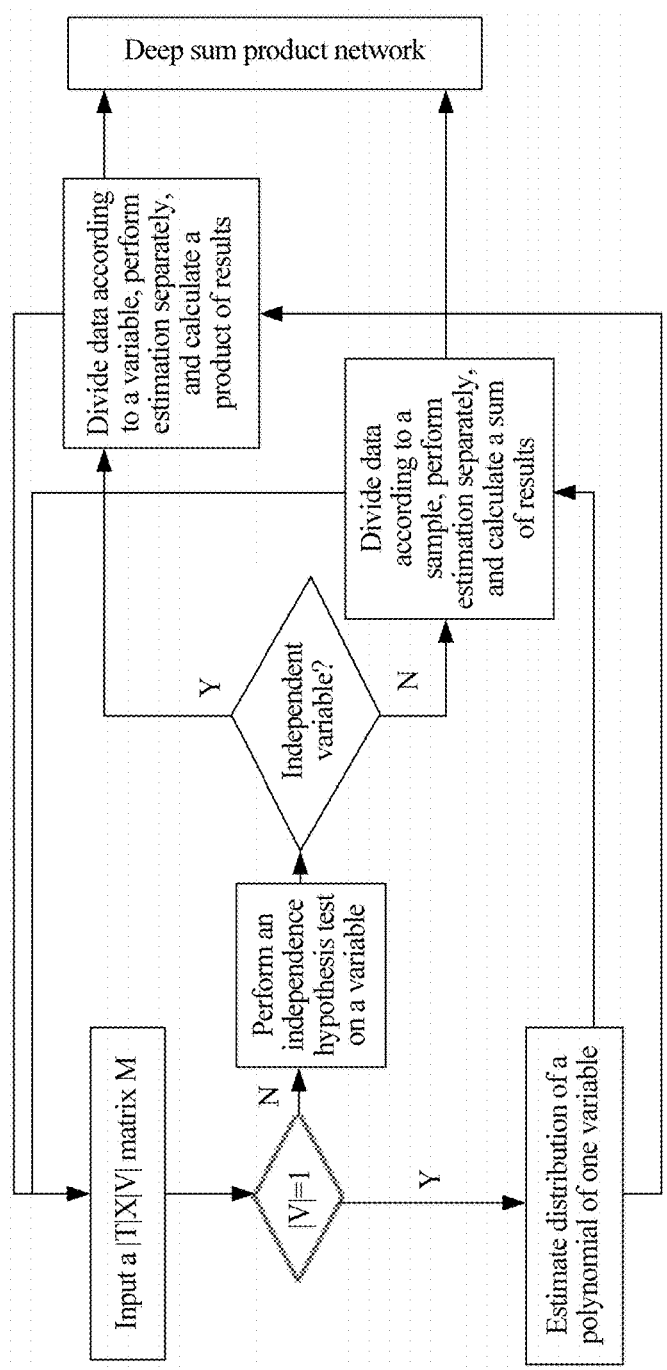
FIG. 3 is a schematic diagram of a training algorithm of a deep sum product network.

FIG. 3 illustrates, from an algorithm dimension, a process of training a deep sum product network. Input of the algorithm is a $|T|\times|V|$ matrix M, where V represents a variable set, T represents a sample set, and output is the deep sum product network. The algorithm is a recursive algorithm. First step, the algorithm determines a quantity $|V|$ of input variables: if $|V|=1$, estimates distribution of a polynomial of one variable directly on sample set T according to matrix M, and returns a result of the estimation; or if $|V|>1$, attempts to perform an independence test on the variable set V, and if a test result is that there are two or more independent variable sets, divides data M according to independent sets, invokes a deep sum product network training algorithm to perform probabilistic estimation on each copy of data, and finally multiplies obtained results and returns a result, or if a test result is that there are less than two independent variable sets, performs mixture model estimation on sample set T according to data M, divides the data in accordance with the samples according to an estimation result, and invokes a deep sum product network training algorithm to perform probabilistic estimation on each copy of data, and finally performs weighted summation on obtained results and returns a result. "Independence test" and "mixture model estimation" are two key steps of this algorithm. An existing technology uses mutual information-based estimation to perform the "independence test", and uses a naive Bayes mixture model to perform the "mixture model estimation".

The following is pseudo code of the deep sum product network training algorithm.

---
Training algorithm: LearnSPNSingle(M, V, T)
---

Input: a training sample matrix M, which is a T|x|V| matrix, where V is a variable set, and T is a sample set
Output: a deep sum product network model
Initialization:
IF |V|=1 THEN
   RETURN distribution of a polynomial of one variable on sample T according to data M,
ELSE
   Perform an independence test on variable V
   IF there are two or more independent variable sets Vi, THEN
     RETURN ΠiLearnSPNSingle(M, Vi, T)
   ELSE
     Perform mixture model estimation on sample T, and divide data into several components Tj
     RETURN Σj|Tj|/|T| LearnSPNSingle(M, V, Tj)
   END IF
END IF A definition, a probability deduction manner, and a training process of a deep sum product network are briefly described above. The following describes a fault diagnosis method for a big-data network system according to an embodiment of the present application in detail with reference to FIG. 4.

Figure 4:
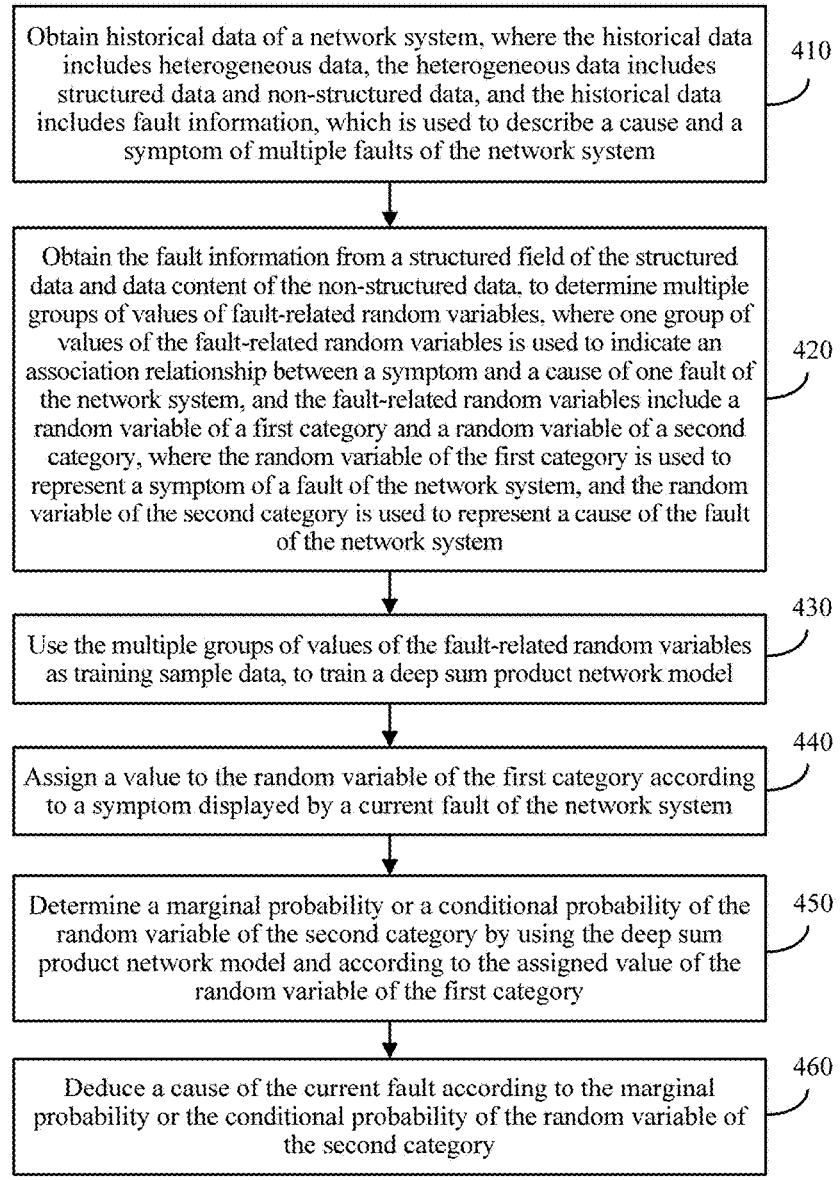
FIG. 4 is a schematic flowchart of a fault diagnosis method for a big-data network system according to an embodiment of the present application.

FIG. 4 is a schematic flowchart of a fault diagnosis method for a big-data network system according to an embodiment of the present application. The method in FIG. 4 includes the following steps.

410. Obtain historical data of the network system, where the historical data includes heterogeneous data, the heterogeneous data includes structured data and non-structured data, and the historical data includes fault information, which is used to describe a cause and a symptom of multiple faults of the network system.

Alternatively, the heterogeneous data includes at least two types of the following: structured data, non-structured data, or semi-structured data.

420. Obtain the fault information from a structured field of the structured data and data content of the non-structured data, to determine multiple groups of values of fault-related random variables, where one group of values of the fault-related random variables is used to indicate an association relationship between a symptom and a cause of one fault of the network system, and the fault-related random variables include a random variable of a first category and a random variable of a second category, where the random variable of the first category is used to represent a symptom of a fault of the network system, and the random variable of the second category is used to represent a cause of the fault of the network system.

430. Use the multiple groups of values of the fault-related random variables as training sample data, to train a deep sum product network model.

440. Assign a value to the random variable of the first category according to a symptom of a current fault of the network system.

450. Determine a marginal probability or a conditional probability of the random variable of the second category by using the deep sum product network model and according to the assigned value of the random variable of the first category.

460. Deduce a cause of the current fault according to the marginal probability or the conditional probability of the random variable of the second category.

A deep sum product network model is a multi-layer non-linear probability model. This type of probability model features large scale, strong expressiveness, high speed and accuracy, and the like, and is mostly applied in an image processing field. In order to apply the deep sum product network model to fault diagnosis in a big-data network system, in this embodiment of the present application, random variables are first divided into a random variable of a first category and a random variable of a second category, and then fault information is extracted from various types of heterogeneous data, so as to assign a value to a random variable, thereby obtaining training sample data that meets a training requirement of the deep sum product network model. After the deep sum product network model is trained, a value is assigned to the random variable of the first category according to a symptom of a current fault of the network system, and then a marginal probability or a conditional probability of the random variable of the second category is deduced, thereby deducing a cause of the current fault of the network system. By using the foregoing manner, in this embodiment of the present application, the deep sum product network model is applied to a fault diagnosis process in the big-data network system, so as to resolve a problem that it is difficult to diagnose a fault of the big-data network system.

It should be understood that, a network system may include structured data, non-structured data, and semi-structured data. In this embodiment of the present application, fault information needs to be first extracted from various types of historical data, so as to assign a value to a fault-related random variable. Manners of extracting information from data of different types are different.

Information in the structured field may be discretized according to a value range of the structured field in the structured data, to determine the values of the fault-related random variables; and/or extract information from the data content of the non-structured data by using at least one of a named-entity recognition algorithm, a keyword extraction algorithm, a relationship extraction algorithm, or a text categorization algorithm, to determine the values of the fault-related random variables.

Structured data, pure non-structured data, and semi-structured data are used as examples in the following and are separately described.

(1) Structured data: Generally, structured data is directly converted. Using a table in a relational database as an example, each row of the table is corresponding to one instance, and each column of the table is corresponding to a subset of different variables. In each column, discretization is performed according to a value range of the column, to convert the column to several variables. For example, a value of a column ("Country") is {"China", "India", "US"}. Then, this column can be converted to three variables, which respectively mean "Country=China", "Country=India", and "Country=US". For a specific instance, if a value of a "Country" column is "India", variables to which the column is converted are [0, 1, 0].

(2) Semi-structured data: Semi-structured data has no fixed structure, and is generally represented in a format such as Extensible Markup Language (XML) or JavaScript Object Notation (JSON). A structured field (such as an XML tag or a JSON key) is enumerable, and each field may be corresponding to one variable subset. If content of each field is also structured, the data is processed in accordance with the manner of processing structured data in (1); or if content of each field is non-structured, the data is processed in accordance with the manner of processing non-structured data in (3).

(3) Non-structured data: Non-structured data refers to unenumerable data with a variable length, typically, such as text, an image, or a video. Methods for processing non-structured data are relatively diversified. Using text data as an example, structured data related to an application (fault diagnosis) needs to be extracted from non-structured data by using an information extraction technology, which mainly includes named entity recognition, which extracts an entity word or phrase that occurs in text; keyword extraction, which extracts an important word and phrase from text; relationship extraction, which extracts a relationship between entities in text; and text categorization, which automatically maps text to a preconfigured categorization system.

The foregoing task needs to be implemented by means of statistics collection, machine learning, data mining, or human assistance according to a characteristic of specific data. Some typical technologies are, for example, named entity recognition: a conditional random field (CRF); keyword extraction: a common weighting technology (term frequency-inverse document frequency (TF-IDF)) model for information retrieval and data mining; relationship extraction: a Bootstrapping method; and text extraction: a categorizer such as a support vector machine (SVM), a decision tree, or a neural network.

The big-data network system has another characteristic. That is, a data volume is large, and symptoms displayed when faults occur on the network system and causes why the faults are generated are generally diversified. In addition, multiple types of heterogeneous data are involved, and many variables are exported from semi-structured data or non-structured data; therefore, a quantity of dimensions of a random variable is generally very large. As a scale of the training data increases, an existing single-machine training algorithm of a deep sum product network converges more slowly or even cannot perform processing.

Optionally, as an embodiment, step 430 may include generating a numerical matrix according to the multiple groups of values, where each row of the numerical matrix is corresponding to one fault of the multiple faults of the network system, and each column of the numerical matrix is corresponding to one variable of the fault-related random variables; dividing the numerical matrix into m×n first submatrices of an equal size, where both m and n are positive integers, and a sum of m and n is greater than or equal to 2; obtaining m×n sum product network models in a distributed training manner and according to the m×n first submatrices; and determining the deep sum product network model according to the m×n sum product network models.

This embodiment of the present application proposes a distributed training manner for a deep sum product network model, where a numerical matrix is divided into multiple submatrices, multiple sum product network models are obtained in a distributed training manner, and then the deep sum product network model is determined based on the multiple obtained sum product network models. The distributed training manner is more suitable for training a deep sum product network model for a big-data network system, which can effectively avoid a problem that an algorithm cannot perform calculation or cannot be converged because a sample size is too large or there are too many random variables.

It should be noted that, there may be multiple manners of determining the deep sum product network model according to the m×n sum product network models. The following describes the manners in detail with reference to specific examples.

Optionally, as an embodiment, the determining the deep sum product network model according to the m×n sum product network models may include calculating a product of sum product network models obtained by training first submatrices that are located in a same row in the m×n first submatrices, to obtain m intermediate sum product network models; and calculating a sum of the m intermediate sum product network models, to obtain the deep sum product network model.

Optionally, as an embodiment, the determining the deep sum product network model according to the m×n sum product network models may include calculating a sum of sum product network models obtained by training first submatrices that are located in a same column in the m×n first submatrices, to obtain n intermediate sum product network models; and calculating a product of the n intermediate sum product network models, to obtain the deep sum product network model.

Optionally, as an embodiment, the determining the deep sum product network model according to the m×n sum product network models may include generating a target matrix that uses the m×n sum product network models as elements; and recursively splitting the target matrix based on an independence test of a random variable and mixture probabilistic model estimation (or referred to as mixture probabilistic model estimation of a sample), to obtain the deep sum product network model, where the deep sum product network uses the m×n sum product network models as leaf nodes.

As shown in FIG. 2, a deep sum product network model is obtained through training based on a training sample matrix and in a manner of combining splitting from a variable dimension and splitting from a sample dimension (that is, column splitting and row splitting of a matrix). In this embodiment of the present application, a splitting manner is also used to train the deep sum product network model. However, the elements in the target matrix in this embodiment of the present application are not numerical values, but are the m×n sum product network models obtained through distributed training. Therefore, a leaf node of the deep sum product network model obtained through training in a similar manner is no longer uni-variate distribution of a random variable, but is one sum product network model of the m×n sum product network models. The following steps may be used for implementation.

Step one: Equally and randomly divide the target matrix according to rows and columns into m×n first submatrices $\{M_{ij}\}$, i=1, . . . , m; j=1, . . . , n.

Step two: Train a deep sum product network $S_{ij}$ with each $M_{ij}$, where this process may be performed in parallel for the m×n $\{M_{ij}\}$, and according to a scale of $M_{ij}$, a manner of training the deep sum product network $S_{ij}$ may use the LearnSPNSingle algorithm mentioned above or a distributed algorithm LearnSPN mentioned in the following.

Step three: For the obtained m×n deep sum product networks $\{S_{ij}\}$, use a LearnSPNProb algorithm in the following to learn a deep sum product network S, where a leaf node of S is a sum product network model.

Figure 5:
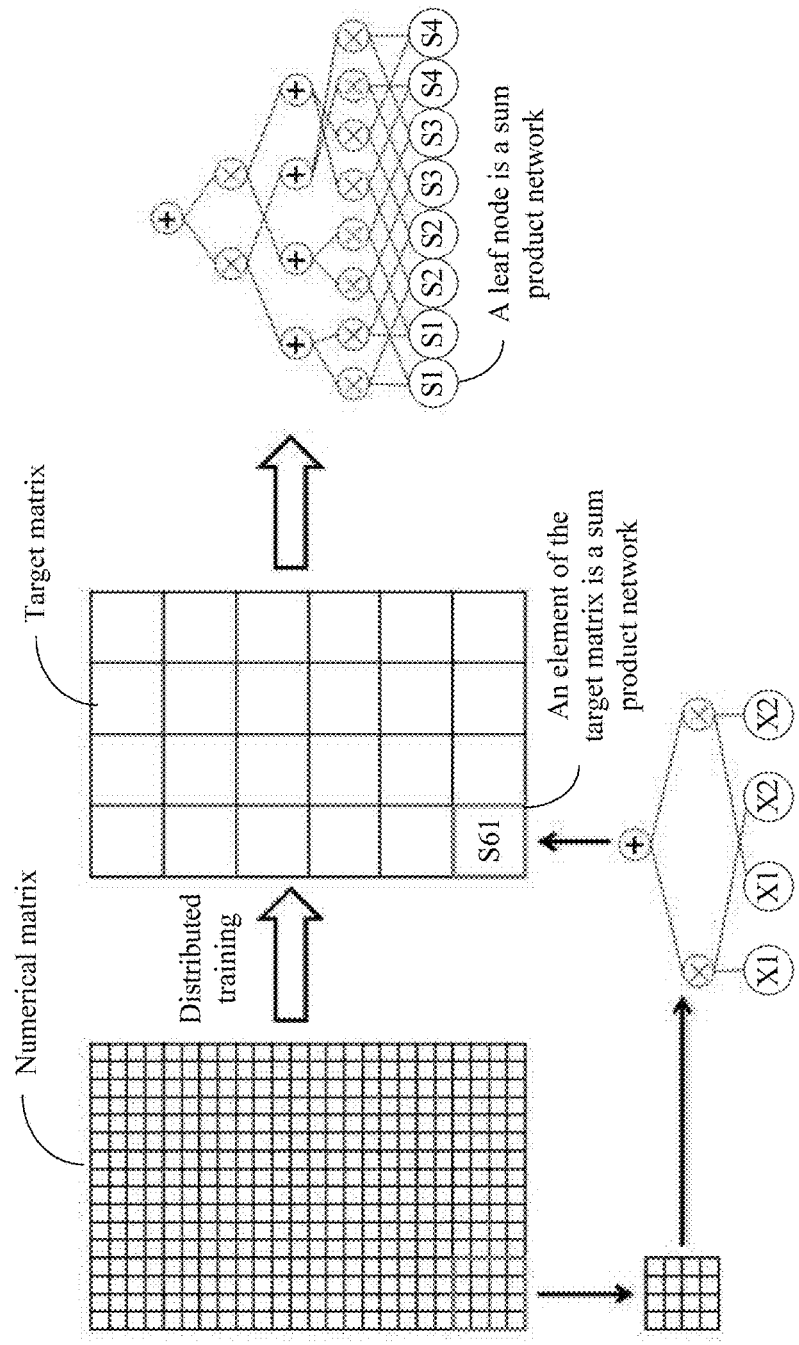
FIG. 5 is an example diagram of a distributed training manner of a deep sum product network according to an embodiment of the present application.

It should be noted that, a main difference between the LearnSPNProb algorithm and the LearnSPNSingle algorithm lies in that input of the latter one is a numerical matrix and input of the former one is a target matrix in probability distribution. More accurately, each element of a target matrix is a sum product network model. For details, refer to FIG. 5. LearnSPNProb stills adopts an idea of constantly splitting an input matrix from a sample dimension or a variable dimension to construct a final deep sum product network. In this algorithm, two most key steps are independence test (corresponding to splitting from the variable dimension) and mixture probabilistic model estimation (corresponding to splitting from the sample dimension). It is assumed that probability distribution of an element $S_{ij}$ of the target matrix is $P_{ij}(x_j)$, i=1, ... m, j=1, ..., n (where $x_j$ represents a group of random variables), and the following describes an independence test and a mixture probabilistic model estimation for target matrix splitting in detail.

Independence Test [1]:

Independence of two groups of random variables is tested by calculating mutual information of the two groups of variables, where a manner of calculating the mutual information may be:

$$I(x_j, x_k) \stackrel{def}{=} \sum_{x_j, x_k} p(x_j, x_k) \log \frac{p(x_j, x_k)}{p(x_j)p(x_k)} =$$

$$\sum_{l=1}^{L} \log \frac{\sum_{i=1}^{n} P_{ij}(x_j^{(l)}) P_{ik}(x_k^{(l)})}{\sum_{i=1}^{n} P_{ij}(x_j^{(l)}) \cdot \sum_{i=1}^{n} P_{ik}(x_k^{(l)})},$$

where $\{(x_j^{(l)}, x_k^{(l)})\}_{l=1}^{L}$ are samples from $P_i(x_j, x_k)$. These samples may be sampled from an initial numerical matrix or may be obtained through sampling by using a Monte Carlo method. When $I(x_j, x_k) < \varepsilon$, the two groups of random variables are considered independent, where $\varepsilon$ is a threshold given in advance.

An independence test is performed between any two groups of random variables, and a line is added between variable groups that are not independent. If a finally formed diagram includes multiple connected components, it indicates that variables are divided in accordance with components; or if a finally formed diagram includes only one connected component, samples are divided in the following mixture probabilistic model manner.

Mixture Probabilistic Model [2]:

In the mixture probabilistic model, assuming that a probability includes K latent components:

$$p_i(x) = \sum_{z=1}^{K} p_i(z) p_i(x|z) = \sum_{z=1}^{K} p(z) \exp\left(-\sum_{j=1}^{n} D_{KL}(p_{zj}(x_j) \| P_{ij}(x_j))\right),$$

where $D_{KL}(p,q) = \Sigma p(x) \log p(x)/q(x)$ indicates a Kullback-Leibler (KL) divergence between distributions. A log-likelihood function of an entire sample is:

$$l(x) = \sum_{i=1}^{m} \log p_i(x),$$

where the likelihood function includes a hidden variable z, and a standard Expectation-maximization (EM) algorithm may be used for optimization and solution. The sample can be divided into K components according to an optimization result, thereby implementing splitting from a sample dimension.

Input of the distributed algorithm LearnSPN for training a deep sum product network is a |T|×|V| numerical matrix M, where V represents a variable set, and T represents a sample set. Output of the algorithm is a deep sum product network. This algorithm equally and randomly divides M into m×n copies of training data (where each copy of data is corresponding to one first submatrix in the foregoing description): $\{(M_{ij}, T_i, V_j), i=1, \ldots, m, j=1, \ldots, n\}$, evenly distributes the m×n copies of the training data to K machines, and performs parallel calculation. When a scale of $M_{ij}$ is relatively small, the single-machine training algorithm LearnSPNSingle may be used for training; or when a scale of $M_{ij}$ is relatively large, the distributed algorithm LearnSPN can still be used for training. After calculation is complete, m×n sum product networks {Sij, i=1, ..., m, j=1, ..., n} are obtained. Then, the LearnSPNProb algorithm for the target matrix is used to construct the final deep sum product network S, where the leaf node of S is the sum product network $\{S_{ij}\}$.

The following is pseudo code of the LearnSPN algorithm and the LearnSPNProb algorithm.

```
Training algorithm: LearnSPN(M, V, T)
  Input: M is a |T|×|V| data matrix, where T is a sample set, V is a
variable set, and a matrix scale threshold is R
  Output: a deep sum product network
  Equally and randomly divide M into m×n training copies of data
from a sample dimension and a variable dimension: {(Mij,Ti,Vj), i=
1,...,m,j=1,...,n}
  Evenly distribute the data to K machines
  FOR k in 1,...,K, perform parallel calculation:
    Train a sum product network with a training set (Mij,Ti,Vj):
    IF |T|×|V| < R THEN
    Sij=LearnSPNSingle(Mij, Ti, Vj)
    ELSE:
       Sij=LearnSPN(Mij, Ti, Vj)
    M = {Sij}
    RETURN LearnSPNProb(M, T, V)
    Training algorithm: LearnSPNProb(M, T, V)
    Input: M is a |T|×|V| probability matrix, where T is a sample set, and
V is a variable set
    Output: a deep sum product network
    IF | V |=1 THEN
       RETURN Σj |Tj|/|T| LearnSPNProb(M, V, Tj)
    ELSE
       Perform an independence test on variable V in accordance with
independence test [1]
       IF there are two or more independent variable sets Vk, THEN
         RETURN Πk LearnSPNProb (M, T, Vk)
       ELSE
         Perform mixture model estimation on sample T according
to mixture probability model [2], and divide data into several
components Tk
         RETURN Σk |Tk|/|T| LearnSPNProb (M, V, Tk)
       END IF
    END IF
```

Figure 6:
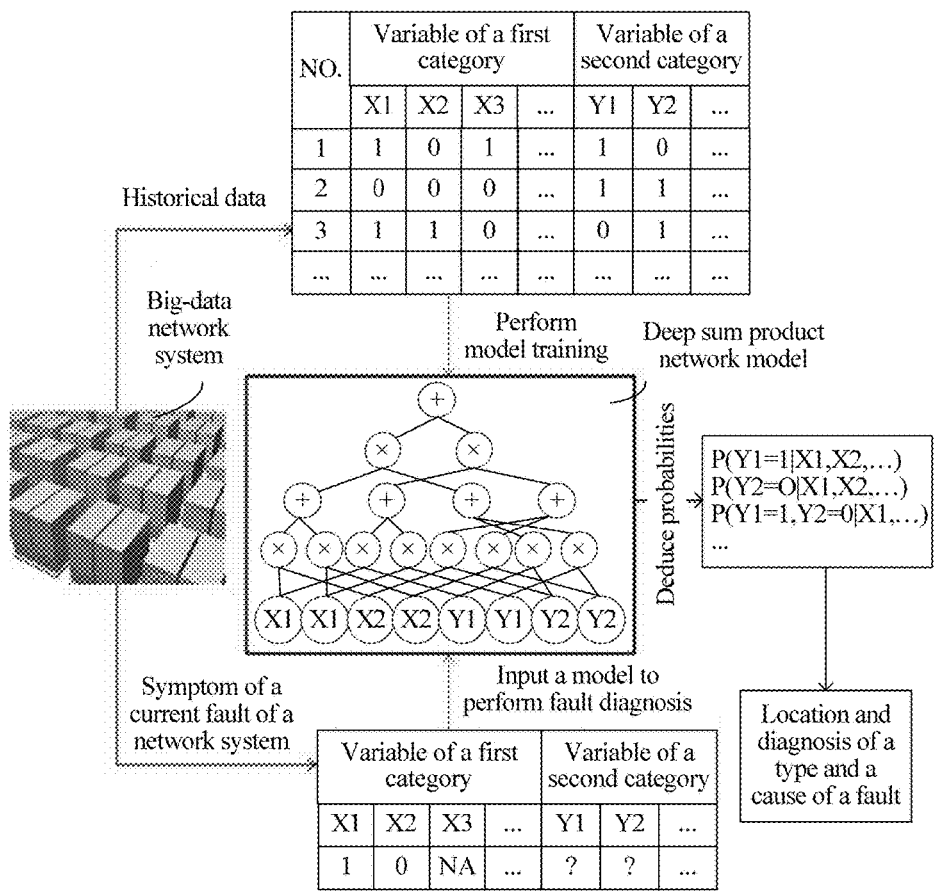
FIG. 6 is a fault diagnosis flowchart of a network system according to an embodiment of the present application.

The following describes the embodiments of the present application in more detail with reference to a specific example. It should be noted that, the example in FIG. 6 is intended only to help a person skilled in the art understand the embodiments of the present application, but is not intended to restrict the embodiments of the present application to a specific numerical value or a specific scenario that is illustrated. A person skilled in the art can perform various equivalent modifications or changes according to the example given in FIG. 6, and such modifications or changes also fall within the scope of the embodiments of the present application.

Referring to FIG. 6, a fault diagnosis method for a big-data network system according to an embodiment of the present application may approximately include the following three steps.

Step one: Collect historical data (which is heterogeneous data and records fault information) from a network system, and process the data to form training sample data (which is a numerical matrix).

Step two: Input the training sample to a deep sum product network model, and perform distributed learning, to obtain the deep sum product network model.

Step three: Collect, from the system, information that includes a fault symptom, so as to assign a value to a random variable of a first category, and deduce a conditional probability or a marginal probability of a random variable of a second category by using the deep sum product network model obtained through training, thereby learning a cause of a current fault of the network system.

For example, the random variable of the second category includes three variables, which respectively indicate three causes that may lead to the fault of the network system; and based on the deduced conditional probability, a cause corresponding to a random variable with a highest conditional probability is used as the cause of the current fault of the network system.

Figure 7:
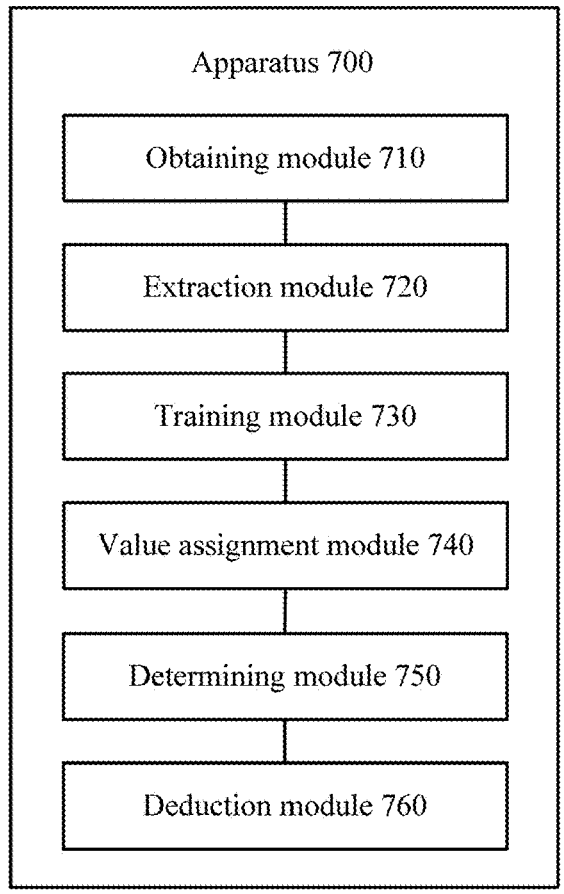
FIG. 7 is a schematic block diagram of a fault diagnosis apparatus for a big-data network system according to an embodiment of the present application.
Figure 8:
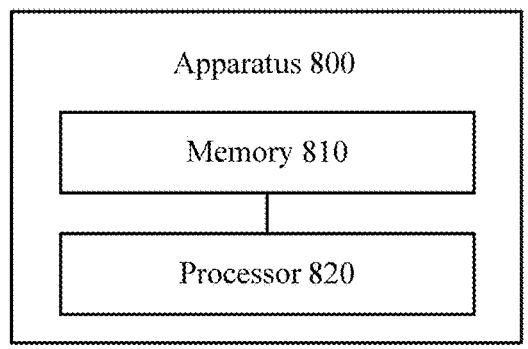
FIG. 8 is a schematic block diagram of a fault diagnosis apparatus for a big-data network system according to an embodiment of the present application.

The foregoing describes the fault diagnosis method for the big-data network system according to the embodiments of the present application in detail with reference to FIGS. 1A, 1B, 1C, and 1D to FIG. 6, and the following describes a fault diagnosis apparatus for a big-data network system according to an embodiment of the present application in detail with reference to FIG. 7 and FIG. 8. It should be understood that, fault diagnosis apparatuses in FIG. 7 and FIG. 8 can implement steps in FIGS. 1A, 1B, 1C, and 1D to FIG. 6. To avoid repetition, details are not described herein.

FIG. 7 is a schematic block diagram of a fault diagnosis apparatus 700 for a big-data network system according to an embodiment of the present application. An apparatus 700 in FIG. 7 includes an obtaining module 710 configured to obtain historical data of the network system, where the historical data is heterogeneous data, the heterogeneous data includes structured data and non-structured data, and the historical data includes fault information, which is used to describe a cause and a symptom of multiple faults of the network system; an extraction module 720 configured to obtain the fault information from a structured field of the structured data and data content of the non-structured data, to determine multiple groups of values of fault-related random variables, where one group of values of the fault-related random variables is used to indicate an association relationship between a symptom and a cause of one fault of the network system, and the fault-related random variables include a random variable of a first category and a random variable of a second category, where the random variable of the first category is used to represent a symptom of a fault of the network system, and the random variable of the second category is used to represent a cause of the fault of the network system; a training module 730 configured to use the multiple groups of values of the fault-related random variables as training sample data, to train a deep sum product network model; a value assignment module 740 configured to assign a value to the random variable of the first category according to a symptom of a current fault of the network system; a determining module 750 configured to determine a marginal probability or a conditional probability of the random variable of the second category by using the deep sum product network model and according to the assigned value of the random variable of the first category; and a deduction module 760 configured to deduce a cause of the current fault according to the marginal probability or the conditional probability of the random variable of the second category.

A deep sum product network model is a multi-layer non-linear probability model. This type of probability model features large scale, strong expressiveness, high speed and accuracy, and the like, and is mostly applied in an image processing field. In order to apply the deep sum product network model to fault diagnosis in a big-data network system, in this embodiment of the present application, random variables are first divided into a random variable of a first category and a random variable of a second category, and then fault information is extracted from various types of heterogeneous data, so as to assign a value to a random variable, thereby obtaining training sample data that meets a training requirement of the deep sum product network model. After the deep sum product network model is trained, a value is assigned to the random variable of the first category according to a symptom of a current fault of the network system, and then a marginal probability or a conditional probability of the random variable of the second category is deduced, thereby deducing a cause of the current fault of the network system. By using the foregoing manner, in this embodiment of the present application, the deep sum product network model is applied to a fault diagnosis process in the big-data network system, so as to resolve a problem that it is difficult to diagnose a fault of the big-data network system.

Optionally, as an embodiment, the training module 730 may be configured to generate a numerical matrix according to the multiple groups of values, where each row of the numerical matrix is corresponding to one fault of the multiple faults of the network system, and each column of the numerical matrix is corresponding to one variable of the fault-related random variables; divide the numerical matrix into m×n first submatrices of an equal size, where both m and n are positive integers, and a sum of m and n is greater than or equal to 2; obtain m×n sum product network models in a distributed training manner and according to the m×n first submatrices; and determine the deep sum product network model according to the m×n sum product network models.

Optionally, as an embodiment, the training module 730 may be configured to calculate a product of sum product network models obtained by training first submatrices that are located in a same row in the m×n first submatrices, to obtain m intermediate sum product network models; and calculate a sum of the m intermediate sum product network models, to obtain the deep sum product network model.

Optionally, as an embodiment, the training module 730 may be configured to calculate a sum of sum product network models obtained by training first submatrices that are located in a same column in the m×n first submatrices, to obtain n intermediate sum product network models; and calculate a product of the n intermediate sum product network models, to obtain the deep sum product network model.

Optionally, as an embodiment, the training module 730 may be configured to generate a target matrix that uses the m×n sum product network models as elements; and recursively split the target matrix based on an independence test of a random variable and mixture probabilistic model estimation, to obtain the deep sum product network model, where the deep sum product network uses the m×n sum product network models as leaf nodes.

Optionally, as an embodiment, the extraction module 720 may be configured to discretize information in the structured field according to a value range of the structured field in the structured data, to determine the values of the fault-related random variables; and/or extract information from the data content of the non-structured data by using at least one of a named-entity recognition algorithm, a keyword extraction algorithm, a relationship extraction algorithm, or a text categorization algorithm, to determine the values of the fault-related random variables.

Optionally, as an embodiment, the structured data is data in a database, and the extraction module 720 may be configured to perform discretization column by column in the database according to a value range of a field corresponding to each column in the database, to obtain the values of the fault-related random variables.

FIG. 8 is a schematic block diagram of a fault diagnosis apparatus for a big-data network system according to an embodiment of the present application. An apparatus 800 in FIG. 8 includes a memory 810 configured to store a program; and a processor 820 configured to execute the program, where when the program is executed, the processor 820 is configured to obtain historical data of the network system, where the historical data is heterogeneous data, the heterogeneous data includes structured data and non-structured data, and the historical data records fault information, which is used to describe a cause and a symptom of multiple faults of the network system; obtain the fault information from a structured field of the structured data and data content of the non-structured data, to determine multiple groups of values of fault-related random variables, where one group of values of the fault-related random variables is used to indicate an association relationship between a symptom and a cause of one fault of the network system, and the fault-related random variables include a random variable of a first category and a random variable of a second category, where the random variable of the first category is used to represent a symptom of a fault of the network system, and the random variable of the second category is used to represent a cause of the fault of the network system; use the multiple groups of values of the fault-related random variables as training sample data, to train a deep sum product network model; assign a value to the random variable of the first category according to a symptom of a current fault of the network system; determine a marginal probability or a conditional probability of the random variable of the second category by using the deep sum product network model and according to the assigned value of the random variable of the first category; and deduce a cause of the current fault according to the marginal probability or the conditional probability of the random variable of the second category.

A deep sum product network model is a multi-layer non-linear probability model. This type of probability model features large scale, strong expressiveness, high speed and accuracy, and the like, and is mostly applied in an image processing field. In order to apply the deep sum product network model to fault diagnosis in a big-data network system, in this embodiment of the present application, random variables are first divided into a random variable of a first category and a random variable of a second category, and then fault information is extracted from various types of heterogeneous data, so as to assign a value to a random variable, thereby obtaining training sample data that meets a training requirement of the deep sum product network model. After the deep sum product network model is trained, a value is assigned to the random variable of the first category according to a symptom of a current fault of the network system, and then a marginal probability or a conditional probability of the random variable of the second category is deduced, thereby deducing a cause of the current fault of the network system. By using the foregoing manner, in this embodiment of the present application, the deep sum product network model is applied to a fault diagnosis process in the big-data network system, so as to resolve a problem that it is difficult to diagnose a fault of the big-data network system.

Optionally, as an embodiment, the processor 820 may be configured to generate a numerical matrix according to the multiple groups of values, where each row of the numerical matrix is corresponding to one fault of the multiple faults of the network system, and each column of the numerical matrix is corresponding to one variable of the fault-related random variables; divide the numerical matrix into m×n first submatrices of an equal size, where both m and n are positive integers, and a sum of m and n is greater than or equal to 2; obtain m×n sum product network models in a distributed training manner and according to the m×n first submatrices; and determine the deep sum product network model according to the m×n sum product network models.

Optionally, as an embodiment, the processor 820 may be configured to calculate a product of sum product network models obtained by training first submatrices that are located in a same row in the m×n first submatrices, to obtain m intermediate sum product network models; and calculate a sum of the m intermediate sum product network models, to obtain the deep sum product network model.

Optionally, as an embodiment, the processor 820 may be configured to calculate a sum of sum product network models obtained by training first submatrices that are located in a same column in the m×n first submatrices, to obtain n intermediate sum product network models; and calculate a product of the n intermediate sum product network models, to obtain the deep sum product network model.

Optionally, as an embodiment, the processor 820 may be configured to generate a target matrix that uses the m×n sum product network models as elements; and recursively split the target matrix based on an independence test of a random variable and mixture probabilistic model estimation, to obtain the deep sum product network model, where the deep sum product network uses the m×n sum product network models as leaf nodes.

Optionally, as an embodiment, the processor 820 may be configured to discretize information in the structured field according to a value range of the structured field in the structured data, to determine the values of the fault-related random variables; and/or extract information from the data content of the non-structured data by using at least one of a named-entity recognition algorithm, a keyword extraction algorithm, a relationship extraction algorithm, or a text categorization algorithm, to determine the values of the fault-related random variables.

Optionally, as an embodiment, the structured data is data in a database, and the processor 820 may be configured to perform discretization column by column in the database according to a value range of a field corresponding to each column in the database, to obtain the values of the fault-related random variables.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A fault diagnosis method for a network system, the method implemented by a computer of the network system, the computer comprising a computer processor, and the method comprising:

obtaining, by the computer processor, historical data of the network system, the historical data being heterogeneous data, the heterogeneous data comprising structured data and non-structured data, the historical data comprising fault information, and the fault information describing a cause and a symptom of multiple faults of the network system;

obtaining, by the computer processor, the fault information from a structured field of the structured data and data content of the non-structured data to determine multiple groups of values of fault-related random variables by discretizing information in the structured field according to a value range of the structured field in the structured data to determine the values of the fault-related random variables, one group of values of the fault-related random variables indicating an association relationship between a symptom and a cause of one fault of the network system, the fault-related random variables comprising a random variable of a first category and a random variable of a second category, the random variable of the first category representing a symptom of a fault of the network system, and the random variable of the second category representing a cause of the fault of the network system;

using, by the computer processor, the multiple groups of values of the fault-related random variables as training sample data to train a deep sum product network model;

assigning, the computer processor, a value to the random variable of the first category according to a symptom of a current fault of the network system;

determining, by the computer processor, a marginal probability or a conditional probability of the random variable of the second category using the deep sum product network model and according to the assigned value of the random variable of the first category; and deducing, by the computer processor, a cause of the current fault according to the marginal probability or the conditional probability of the random variable of the second category.

2. The method of claim 1, wherein the structured data is data in a database, and discretizing information in the structured field according to the value range of the structured field in the structured data to determine the values of the fault-related random variables comprises performing discretization column by column in the database according to a value range of a field corresponding to each column in the database to obtain the values of the fault-related random variables.

3. A fault diagnosis method for a network system, the method implemented by a computer of the network system, the computer comprising a computer processor, and the method comprising:

obtaining, by the computer processor, historical data of the network system, the historical data being heterogeneous data, the heterogeneous data comprising structured data and non-structured data, the historical data comprising fault information, and the fault information describing a cause and a symptom of multiple faults of the network system;

obtaining, by the computer processor, the fault information from a structured field of the structured data and data content of the non-structured data to determine multiple groups of values of fault-related random variables, one group of values of the fault-related random variables indicating an association relationship between a symptom and a cause of one fault of the network system, the fault-related random variables comprising a random variable of a first category and a random variable of a second category, the random variable of the first category representing a symptom of a fault of the network system, and the random variable of the second category representing a cause of the fault of the network system;

using, by the computer processor, the multiple groups of values of the fault-related random variables as training sample data to train a deep sum product network model by:

generating a numerical matrix according to the multiple groups of values, each row of the numerical matrix corresponding to one fault of the multiple faults of the network system, and each column of the numerical matrix corresponding to one variable of the fault-related random variables;

dividing the numerical matrix into m×n first submatrices of an equal size, both m and n being positive integers, and a sum of m and n being greater than or equal to two;

obtaining m×n sum product network models in a distributed training manner and according to the m×n first submatrices; and determining the deep sum product network model according to the m×n sum product network models;

assigning, by the computer processor, a value to the random variable of the first category according to a symptom of a current fault of the network system;

determining, by the computer processor, a marginal probability or a conditional probability of the random variable of the second category using the deep sum product network model and according to the assigned value of the random variable of the first category; and deducing, by the computer processor, a cause of the current fault according to the marginal probability or the conditional probability of the random variable of the second category.

4. The method of claim 3, wherein determining the deep sum product network model according to the m×n sum product network models comprises:

calculating a product of sum product network models obtained by training first submatrices that are located in a same row in the m×n first submatrices to obtain m intermediate sum product network models; and calculating a sum of the m intermediate sum product network models to obtain the deep sum product network model.

5. The method of claim 3, wherein determining the deep sum product network model according to the m×n sum product network models comprises:

calculating a sum of sum product network models obtained by training first submatrices that are located in a same column in the m×n first submatrices to obtain n intermediate sum product network models; and calculating a product of the n intermediate sum product network models to obtain the deep sum product network model.

6. The method of claim 3, wherein determining the deep sum product network model according to the m×n sum product network models comprises:

generating a target matrix that uses the m×n sum product network models as elements; and recursively splitting the target matrix based on an independence test of a random variable and mixture probabilistic model estimation to obtain the deep sum product network model, the deep sum product network using the m×n sum product network models as leaf nodes.

7. A fault diagnosis method for a network system, the method implemented by a computer of the network system, the computer comprising a computer processor, and the method comprising:

obtaining, by the computer processor, historical data of the network system, the historical data being heterogeneous data, the heterogeneous data comprising structured data and non-structured data, the historical data comprising fault information, and the fault information describing a cause and a symptom of multiple faults of the network system;

obtaining, by the computer processor, the fault information from a structured field of the structured data and data content of the non-structured data to determine multiple groups of values of fault-related random variables by extracting information from the data content of the non-structured data using at least one of a named-entity recognition algorithm, a keyword extraction algorithm, a relationship extraction algorithm, or a text categorization algorithm to determine the values of the fault-related random variables, one group of values of the fault-related random variables indicating an association relationship between a symptom and a cause of one fault of the network system, the fault-related random variables comprising a random variable of a first category and a random variable of a second category, the random variable of the first category representing a symptom of a fault of the network system, and the random variable of the second category representing a cause of the fault of the network system;

using, by the computer processor, the multiple groups of values of the fault-related random variables as training sample data to train a deep sum product network model;

assigning, by the computer processor, a value to the random variable of the first category according to a symptom of a current fault of the network system;

determining, by the computer processor, a marginal probability or a conditional probability of the random variable of the second category using the deep sum product network model and according to the assigned value of the random variable of the first category; and deducting, the computer processor, a cause of the current fault according to the marginal probability or the conditional probability of the random variable of the second category.

8. A fault diagnosis method for a network system, the method implemented by a computer of the network system, the computer comprising a computer processor, and the method comprising:

obtaining, by the computer processor, historical data of the network system, the historical data being heterogeneous data, the heterogeneous data comprising structured data and non-structured data, the historical data comprising fault information, and the fault information describing a cause and a symptom of multiple faults of the network system;

obtaining, by the computer processor, the fault information from a structured field of the structured data and data content of the non-structured data to determine multiple groups of values of fault-related random variables by:
discretizing information in the structured field according to a value range of the structured field in the structured data, to determine the values of the fault-related random variables; and
extracting information from the data content of the non-structured data using at least one of a named-entity recognition algorithm, a keyword extraction algorithm, a relationship extraction algorithm, or a text categorization algorithm, to determine the values of the fault-related random variables, one group of values of the fault-related random variables indicating an association relationship between a symptom and a cause of one fault of the network system, the fault-related random variables comprising a random variable of a first category and a random variable of a second category, the random variable of the first category representing a symptom of a fault of the network system, and the random variable of the second category representing a cause of the fault of the network system;
using, by the computer processor, the multiple groups of values of the fault-related random variables as training sample data to train a deep sum product network model;
assigning, by the computer processor, a value to the random variable of the first category according to a symptom of a current fault of the network system;
determining, by the computer processor, a marginal probability or a conditional probability of the random variable of the second category using the deep sum product network model and according to the assigned value of the random variable of the first category; and
deducing, by the computer processor, a cause of the current fault according to the marginal probability or the conditional probability of the random variable of the second category.

9. A fault diagnosis apparatus for a network system, comprising:
a non-transitory computer readable medium having instructions stored thereon; and
a computer processor coupled to the non-transitory computer readable medium and configured to execute the instructions to:
obtain historical data of the network system, the historical data being heterogeneous data, the heterogeneous data comprising structured data and non-structured data, and the historical data comprising fault information, which describes a cause and a symptom of multiple faults of the network system;
obtain the fault information from a structured field of the structured data and data content of the non-structured data to determine multiple groups of values of fault-related random variables by discretizing information in the structured field according to a value range of the structured field in the structured data to determine the values of the fault-related random variables, one group of values of the fault-related random variables indicating an association relationship between a symptom and a cause of one fault of the network system, the fault-related random variables comprising a random variable of a first category and a random variable of a second category, the random variable of the first category representing a symptom of a fault of the network system, and the random variable of the second category representing a cause of the fault of the network system;
use the multiple groups of values of the fault-related random variables as training sample data to train a deep sum product network model;
assign a value to the random variable of the first category according to a symptom of a current fault of the network system;
determine a marginal probability or a conditional probability of the random variable of the second category using the deep sum product network model and according to the assigned value of the random variable of the first category; and
deduce a cause of the current fault according to the marginal probability or the conditional probability of the random variable of the second category.

10. The apparatus of claim 9, according to wherein the structured data is data in a database, and the computer processor is further configured to perform discretization column by column in the database according to a value range of a field corresponding to each column in the database to obtain the values of the fault-related random variables.

11. A fault diagnosis apparatus for a network system, comprising:
a non-transitory computer readable medium having instructions stored thereon; and
a computer processor coupled to the non-transitory computer readable medium and configured to execute the instructions to:
obtain historical data of the network system, the historical data being heterogeneous data, the heterogeneous data comprising structured data and non-structured data, and the historical data comprising fault information, which describes a cause and a symptom of multiple faults of the network system;
obtain the fault information from a structured field of the structured data and data content of the non-structured data to determine multiple groups of values of fault-related random variables by discretizing information in the structured field according to a value range of the structured field in the structured data to determine the values of the fault-related random variables, one group of values of the fault-related random variables indicating an association relationship between a symptom and a cause of one fault of the network system, the fault-related random variables comprising a random variable of a first category and a random variable of a second category, the random variable of the first category representing a symptom of a fault of the network system, and the random variable of the second category representing a cause of the fault of the network system;
use the multiple groups of values of the fault-related random variables as training sample data to train a deep sum product network model by:
generating a numerical matrix according to the multiple groups of values, each row of the numerical matrix corresponding to one fault of the multiple faults of the network system, and each column of the numerical matrix corresponding to one variable of the fault-related random variables;
dividing the numerical matrix into m×n first submatrices of an equal size, both m and n being positive integers, and a sum of m and n being greater than or equal to two;

obtaining m×n sum product network models in a distributed training manner and according to the m×n first submatrices; and determining the deep sum product network model according to the m×n sum product network models;

assign a value to the random variable of the first category according to a symptom of a current fault of the network system;

determine a marginal probability or a conditional probability of the random variable of the second category using the deep sum product network model and according to the assigned value of the random variable of the first category; and deduce a cause of the current fault according to the marginal probability or the conditional probability of the random variable of the second category.

12. The apparatus of claim 11, wherein the computer processor is further configured to execute the instructions to:

calculate a product of sum product network models obtained by training first submatrices that are located in a same row in the m×n first submatrices to obtain m intermediate sum product network models; and calculate a sum of the m intermediate sum product network models to obtain the deep sum product network model.

13. The apparatus of claim 11, wherein the computer processor is further configured to execute the instructions to:

calculate a sum of sum product network models obtained by training first submatrices that are located in a same column in the m×n first submatrices to obtain n intermediate sum product network models; and calculate a product of the n intermediate sum product network models to obtain the deep sum product network model.

14. The apparatus of claim 11, wherein the computer processor is further configured to execute the instructions to:

generate a target matrix that uses the m×n sum product network models as elements; and recursively split the target matrix based on an independence test of a random variable and mixture probabilistic model estimation to obtain the deep sum product network model, the deep sum product network using the m×n sum product network models as leaf nodes.

15. A fault diagnosis apparatus for a network system, comprising:

a non-transitory computer readable medium having instructions stored thereon; and a computer processor coupled to the non-transitory computer readable medium and configured to execute the instructions to:

obtain historical data of the network system, the historical data being heterogeneous data, the heterogeneous data comprising structured data and non-structured data, and the historical data comprising fault information, which describes a cause and a symptom of multiple faults of the network system;

obtain the fault information from a structured field of the structured data and data content of the non-structured data to determine multiple groups of values of fault-related random variables by extracting information from the data content of the non-structured data using at least one of a named-entity recognition algorithm, a keyword extraction algorithm, a relationship extraction algorithm, or a text categorization algorithm to determine the values of the fault-related random variables, one group of values of the fault-related random variables indicating an association relationship between a symptom and a cause of one fault of the network system, the fault-related random variables comprising a random variable of a first category and a random variable of second category, the random variable of the first category representing a symptom of a fault of the network system, and the random variable of the second category representing a cause of the fault of the network system;

use the multiple groups of values of the fault-related random variables as training sample data to train a deep sum product network model;

assign a value to the random variable of the first category according to a symptom of a current fault of the network system;

determine a marginal probability or a conditional probability of the random variable of the second category using the deep sum product network model and according to the assigned value of the random variable of the first category; and deduce a cause of the current fault according to the marginal probability or the conditional probability of the random variable of the second category.

16. A fault diagnosis apparatus for a network system, comprising:

a non-transitory computer readable medium having instructions stored thereon; and a computer processor coupled to the non-transitory computer readable medium and configured to execute the instructions to:

obtain historical data of the network system, the historical data being heterogeneous data, the heterogeneous data comprising structured data and non-structured data, and the historical data comprising fault information, which describes a cause and a symptom of multiple faults of the network system;

obtain the fault information from a structured field of the structured data and data content of the non-structured data to determine multiple groups of values of fault-related random variables by:

discretizing information in the structured field according to a value range of the structured field in the structured data to determine the values of the fault-related random variables; and extracting information from the data content of the non-structured data using at least one of a named-entity recognition algorithm, a keyword extraction algorithm, a relationship extraction algorithm, or a text categorization algorithm to determine the values of the fault-related random variables, one group of values of the fault-related random variables indicating an association relationship between a symptom and a cause of one fault of the network system, the fault-related random variables comprising a random variable of a first category and a random variable of a second category, the random variable of the first category representing symptom of a fault of the network system, and the random variable of the second category representing a cause of the fault of the network system;

use the multiple groups of values of the fault-related random variables as training sample data to train a deep sum product network model;

assign a value to the random variable of the first category according to a symptom of a current fault of the network system;

determine a marginal probability or a conditional probability of the random variable of the second category using the deep sum product network model and according to the assigned value of the random variable of the first category; and deduce a cause of the current fault according to the marginal probability or the conditional probability of the random variable of the second category.

* * * * *

UNITED STATES PATENT AND TRADEMARK OFFICE
CERTIFICATE OF CORRECTION

PATENT NO. : 10,255,129 B2
APPLICATION NO. : 15/292561
DATED : April 9, 2019
INVENTOR(S) : Xin Jiang and Hang Li It is certified that error appears in the above-identified patent and that said Letters Patent is hereby corrected as shown below:

On the Title Page

Item (30), Line 1: "201510669888" should read "201510669888.2"

In the Claims

Column 18, Line 34: "assigning, the computer" should read "assigning, by the computer"

Column 22, Line 17: delete "acording to"

Column 24, Line 6: insert --a-- before "second category"

Column 24, Line 59: insert --a-- after "representing"

Signed and Sealed this
Twenty-fifth Day of June, 2019

Andrei Iancu
*Director of the United States Patent and Trademark Office*